(12) United States Patent
Karlsson et al.

(10) Patent No.: US 6,279,647 B1
(45) Date of Patent: Aug. 28, 2001

(54) METHOD AND DEVICE FOR SENSING A CLEARANCE

(75) Inventors: Kurt Karlsson, Tyresö; Stig Lundin, Värmdö, both of (SE)

(73) Assignee: ABB Air Preheater Inc., Wellsville, NY (US)

(*) Notice: Subject to any disclaimer, the term of this patent is extended or adjusted under 35 U.S.C. 154(b) by 0 days.

(21) Appl. No.: 09/230,142
(22) PCT Filed: Aug. 14, 1997
(86) PCT No.: PCT/SE97/01348
§ 371 Date: Apr. 27, 1999
§ 102(e) Date: Apr. 27, 1999
(87) PCT Pub. No.: WO98/06994
PCT Pub. Date: Feb. 19, 1998

(30) Foreign Application Priority Data

Aug. 15, 1996 (SE) .................................................. 9602991

(51) Int. Cl.⁷ .................................................. F23L 15/02
(52) U.S. Cl. .................... 165/9; 165/11.1; 73/579; 73/581; 376/245
(58) Field of Search .................. 165/4, 8, 9, 10, 165/11.1, 11.2; 73/579, 581; 376/245

(56) References Cited

U.S. PATENT DOCUMENTS

| | | | |
|---|---|---|---|
| 2,503,720 | * 4/1950 | Gieseke | 33/147 X |
| 3,122,200 | * 2/1964 | Koch | 165/9 |
| 3,232,335 | 2/1966 | Kalbfleisch . | |
| 3,246,686 | 4/1966 | Kalbfleisch et al. . | |
| 3,250,316 | * 5/1966 | Nyberg | 165/9 |
| 4,206,803 | * 6/1980 | Finnemore et al. | 165/9 |
| 4,298,055 | * 11/1981 | Ritter | 165/9 |
| 4,306,612 | 12/1981 | Baker et al. . | |
| 4,523,466 | * 6/1985 | Lubin et al. | 73/579 |
| 5,251,491 | * 10/1993 | Nakaoka et al. | 73/579 X |
| 5,348,225 | * 9/1994 | Hwang | 165/11.1 X |

FOREIGN PATENT DOCUMENTS

| | | | |
|---|---|---|---|
| 1385792 | 2/1975 | (GB) . | |
| 1573117 | 8/1980 | (GB) . | |
| 2281393 | 3/1995 | (GB) . | |
| 0099589 | * 7/1980 | (JP) | 165/9 |
| 0166292 | * 7/1987 | (JP) | 165/9 |
| 0239312 | * 9/1989 | (JP) | 165/9 |

* cited by examiner

*Primary Examiner*—Christopher Atkinson
(74) *Attorney, Agent, or Firm*—Frishauf, Holtz, Goodman, Langer & Chick, P.C.

(57) ABSTRACT

A method and an arrangement for sensing the clearance between an object and an object-adjacent surface, which is particularly for use in difficult ambient conditions, such as in dirty, corrosive environments and under varying temperature and pressure conditions, e.g. to measure and hold constant the clearance between the sector plates (3, 4) of a regenerative rotary air preheater and the end surfaces of the rotor (2, 8). The sensing device (7) includes a compressed-air operated pipe (9) which is mounted on the object (3, 4) and which includes a sound-emitting opening (14) located adjacent the surface (8), wherein changes in the distance (S) between the object (3, 4) and the surface (8) are represented by changes that occur in the resonant frequency of the pipe (9).

7 Claims, 3 Drawing Sheets

METHOD AND DEVICE FOR SENSING A CLEARANCE

BACKGROUND OF THE INVENTION

The present invention relates to a method of sensing the clearance between an object and a surface that lies adjacent thereto, and of generating a signal representative of the magnitude of said clearance for adjusting the clearance to a desired magnitude with the aid of an adjusting device controlled in dependence on said signal.

The invention also relates to an arrangement by means of which the method can be carried out.

Clearances ranging from some tenths of a millimetre up to several millimetres can be measured in many ways. The measuring process applied, however immediately becomes more complicated when it is effected in order to generate a signal that controls a setting device for adjusting the clearance. This is particularly true of measuring processes that are effected in a troublesome atmosphere, such as in the case of regenerative rotary heat-exchangers that operate in a corrosive atmosphere contaminated with soot for instance, and under high, varying pressure and temperature conditions.

In an application of this nature, the clearance between moving sector plates or seals and a rotor surface must be held constant, said rotor being through-passed axially by air and combustion gases for instance.

As will be evident from U.S. Pat. No. 3,246,686. Mobile mechanical sensors have been tested, although ambient conditions have been found too troublesome with respect to bearings and journals among other things.

The same applies to the devices disclosed in U.S. Pat. No. 3,232,335. These devices include on the one hand a sliding shoe that slides against the rotor and on the other hand an inductive component and a compressed-air jet for contactless sensing of a clearance. Dirtying of the slide shoe and its bearings makes the use of this solution impossible in practice. A corrosive atmosphere and high temperatures make the use of an inductive device impossible in practice and the markedly varying pressure conditions in particular have a pronounced effect on measuring processes that use a jet of compressed air.

Sliding shoes made of ceramics and carbon or graphite have been proposed in recent years. However, these shoes result in higher friction and in problems relating to lubrication of contacting surfaces, subsequent adjustment of clearances, among other things. The use of air cushions has been proposed as an alternative to sliding shoes. The use of air cushions, however, introduces complications, partly as a result of the greatly varying pressure conditions. A sensing device that includes fibre optics for infrared light beams has also been proposed (U.S. Pat. No. 4,306,612). Such sensing devices are troubled by corrosion, dirt contamination, etc., and do not therefore provide a satisfactory solution.

The object of the invention is to provide a method and an arrangement of the kind defined in the introduction that will enable clearance ranging from some tenths of a millimetre to several miliimetres to be measured simply and positively in all relevant ambient conditions.

This object is achieved with the method comprising the method steps set forth in claim 1 and with the arrangement that has the characteristic features set forth in claim 2

SUMMARY OF THE INVENTION

The invention is based on the understanding that a whistle pipe, organ pipe or flute can be tuned to an exact resonance frequency and that the so-called end correction and the resonance frequency will change markedly when an object is brought into the close vicinity of a sound-emitting opening of the pipe or flute, while a change in the length of the pipe or flute will cause the resonance frequency to change in accordance with the change in length. Hence, by identifying and utilizing said frequency, it is possible to control a setting device for adjusting a clearance. Trials have shown that a frequency change of 50 Hz can correspond to a change in clearance of from 2 to 3 mm. Since frequencies of some few Hz can be measured readily, it will be understood that the invention affords an accuracy that has not earlier been achieved. The only driving force required to operate the pipe is a weak compress-air flow. One particular advantage afforded by the invention is that the frequency is highly insensitive to external or ambient conditions, which although affecting the strength of the sound that is generated have no affect on the resonance frequency.

BRIEF DESCRIPTION OF THE DRAWINGS

The invention will now be described in more detail with reference to exemplifying embodiments of the invention and with reference to the accompanying schematic drawings, of which

DETAILED DESCRIPTION

Figure 1:
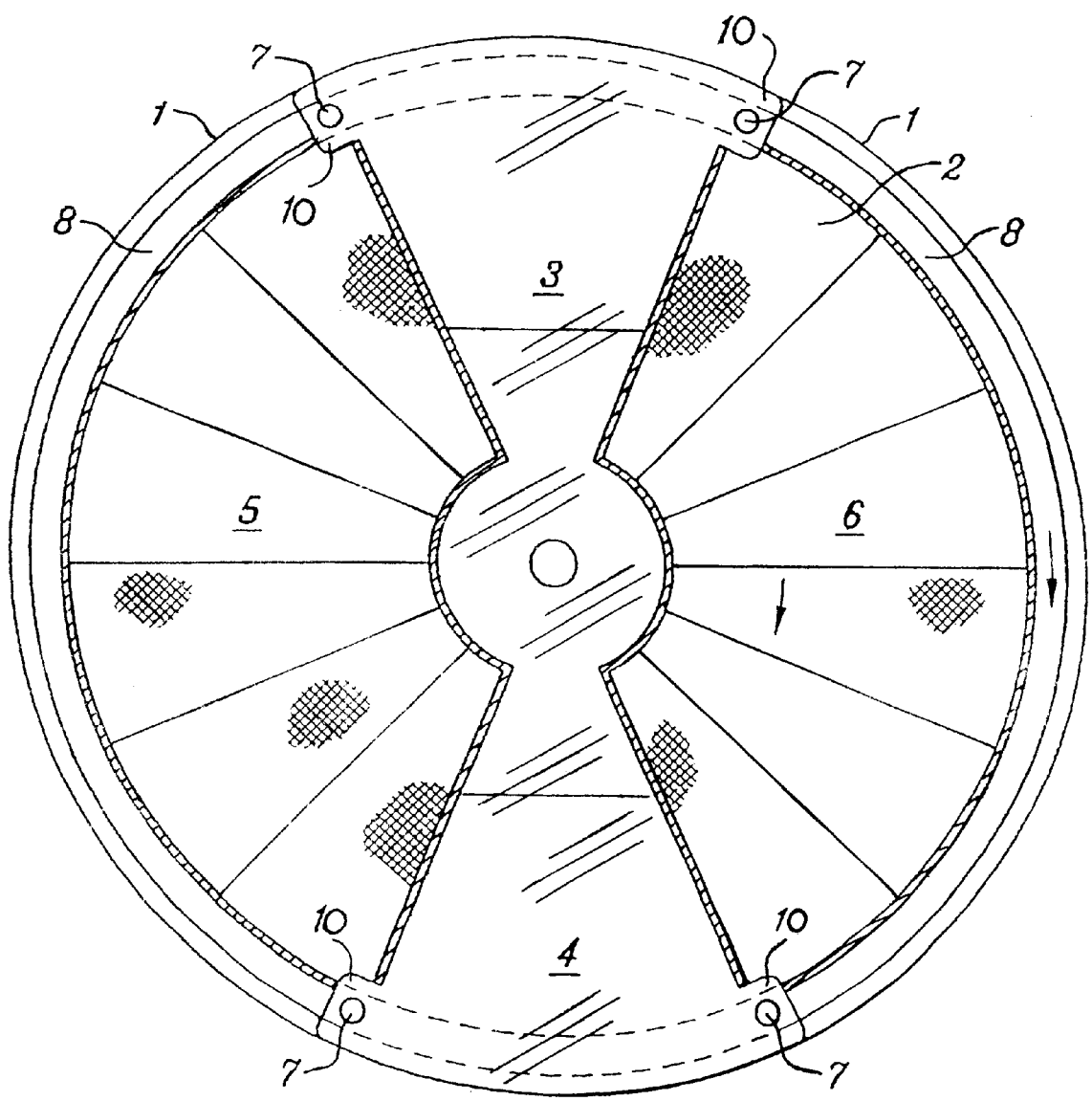
FIG. 1 shows part of an air-preheater from above.

FIG. 1 shows a typical rotary regenerative heat exchanger which is intended for preheating combustion air with the aid of exhaust gases and which includes a stationary housing 1 and a rotor 2 that has a regenerator mass and is mounted for rotation in the housing 1. Two objects comprising axially movable sector plates 3, 4 are mounted on bearings above and beneath the rotor and close to its end surface. The sector plates 3, 4 separate a gas side 5 from an air side 6, wherewith although gas and air is able to enter the clearance beneath respective sector plates 3, 4 due to rotation of the rotor, no direct leakage need occur from one side to the other provided that the clearance between the sector plates 3, 4 and the ends of rotor can be kept small in spite of the fact that the ends of the rotor will never be completely flat.

Figure 2:
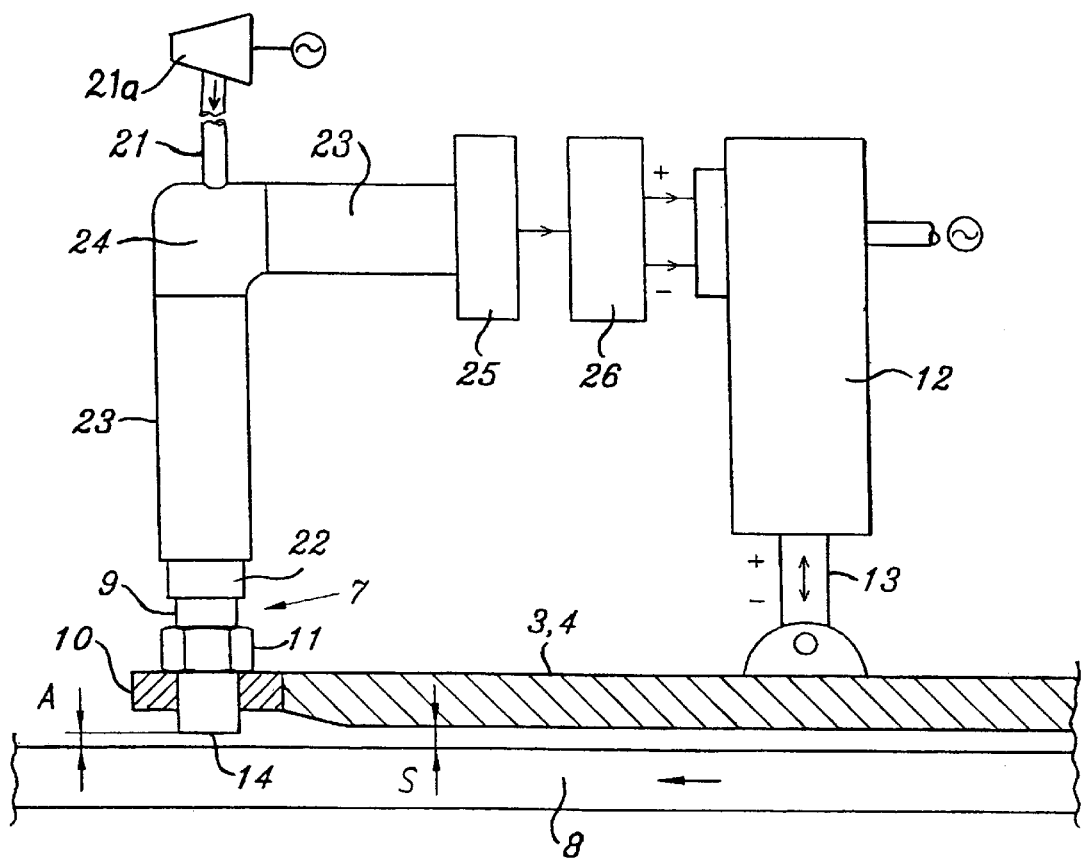
FIG. 2 is a partly sectioned side view of a sector-plate mounted arrangement for contactless measuring of the clearance to a rotor.

The outer ends of the sector plates 3. 4 are guided by sensing devices 7 that coact with an object-adjacent surface comprising a circular flange 8 extending around the rotor circumference at the top and at the bottom of the rotor 2, as evident from FIG. 2.

The sensing devices 7 comprise of a compressed-air operated pipe 9, of the whistle pipe, flute or organ pipe kind, that has a sound-emitting end opening 14 and that has been tuned to a specific frequency. Each sensing device 7 is attached to a lug 10 that projects out from each side of a respective sector plate 3, 4 immediately above the upper rotor flange 8 and immediately beneath the lower rotor flange (not shown). The bottom part of the pipe 9 is threaded and screwed into a hole provided in the lug 10, and locked with a lock nut 11.

The sector plates 3, 4 are set by means of a setting device 12 which is fixedly attached to the housing and has an adjuster rod 13 connected to a respective sector plate, said sector plates being set with the underside about 2 mm from the rotor end and the flange 8.

Figure 3:
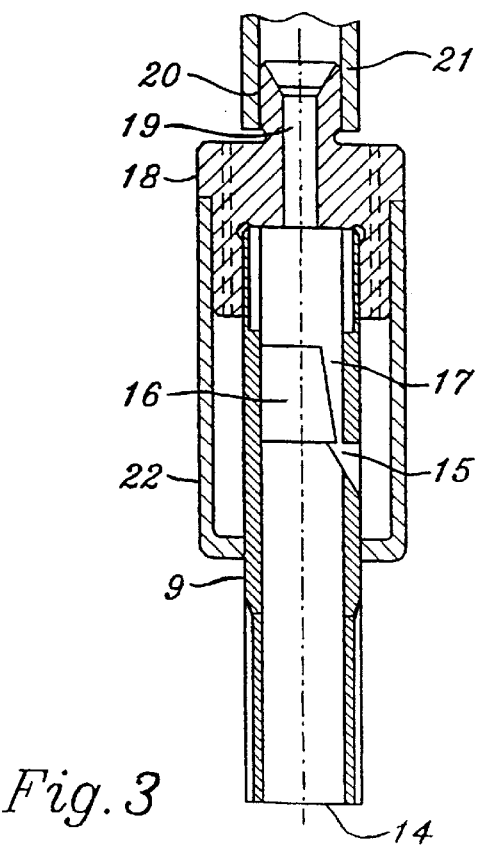
FIG. 3 is a longitudinal section view of an open pipe included in the arrangement shown in FIG. 2.

The pipe 9 has the well-known form shown in FIG. 3, including a straight tube in which a so-called mouth opening 15 has been made. A block 16 that includes an air passageway 17 is inserted edge to edge with the upper edge of the opening 15. Provided at the upper end of the pipe 9 is a nozzle 18 that includes a compressed-air passageway 19 that opens into a nipple 20 which is connected to a hose 21 that leads to a source 21a of compressed-air.

A sleeve 22 is mounted around part of the pipe 9 and the nozzle 18 and functions as an attachment means for a hose lead 23 that communicates with the sleeve interior, where the mouth opening 15 is located, by means of passageways not shown. The hose lead 23 has a transit or lead-through 24 for the hose 21 and is connected to a resonance frequency indicating device comprising a microphone 25 which, in turn, is connected to a frequency measuring device 26 that includes a necessary filter and amplifier. The frequency measuring device is designed to control the setting device 12 so that if the clearance $\underline{S}$ between the underside of respective sector plates 3, 4 and the rotor flange 8 should decrease, the frequency measuring device 26 will deliver a first signal that causes the setting device 12 to lift the sector plate 3, 4 slightly. If the clearance $\underline{S}$ should increase, the frequency measuring device will deliver a second signal that causes the setting device 12 to lower the sector plate 3, 4 slightly.

This function of the sensing device 7 is based on the fact that when a surface approaches the end opening 14 of the pipe 9, the end correction of the resonance tube will be affected within a distance equal to 0.6 times the end diameter of said tube, therewith resulting in an increase in the resonance frequency or a decrease in the resonance frequency if the distance should decrease.

Figure 4:
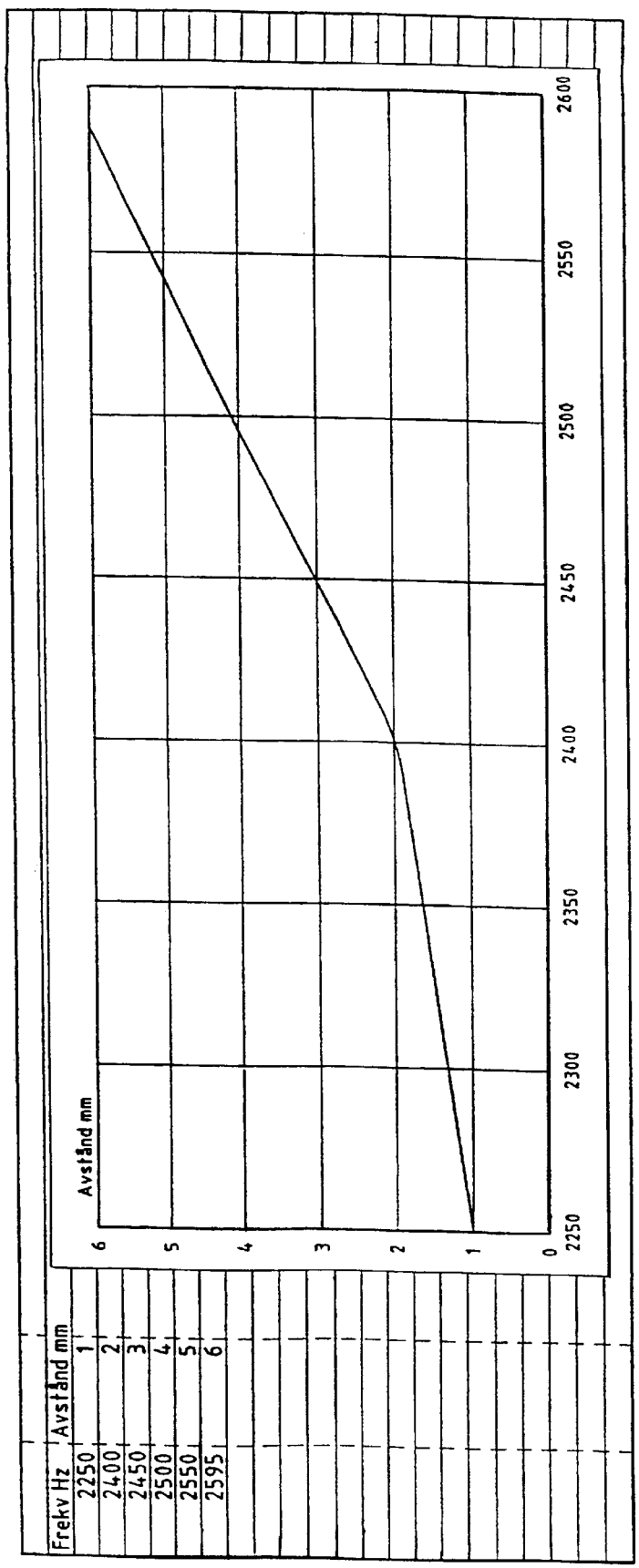
FIG. 4 is a graph that shows measured frequency as a function of clearance.

FIG. 4 shows how the frequency is changed when the gap $\underline{A}$ between the end surface 14 of the pipe 9 and the rotor flange 8 is changed between 1 mm and 6 mm in a certain case.

Figure 5:
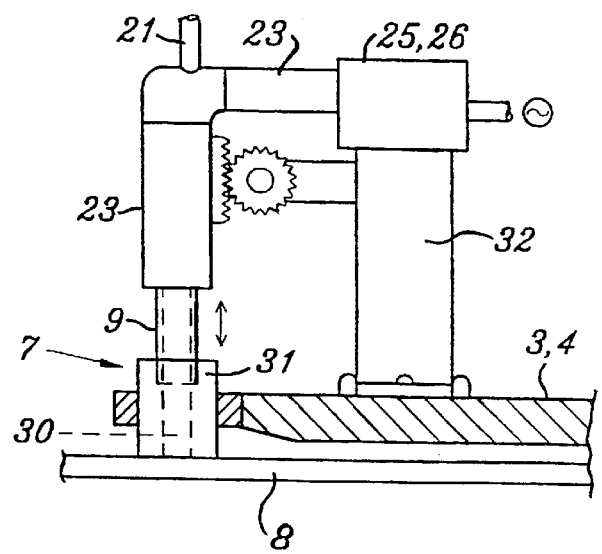
FIG. 5 is a partly sectioned side view of another embodiment of the invention.

FIG. 5 shows a modified version of the sensing device. In this case, the bottom part of the pipe 9 has the form of a bore 30 drilled in a carbon or graphite block forming an end sleeve 31 and thus forming a continuation of the bore in the pipe 9. The block has an open end that 31 is arranged to slide on the flange 8 and the pipe 9 therefore forms a closed pipe with the singularity of initially being tuned to a resonance frequency that is dependent on the length of the pipe 9. When wear occurs on the end sleeve 31, the pipe 9 will have a shorter length and the frequency therefore increase. The frequency is measured in the same way as that described with reference to FIG. 2 and when the frequency has increased by a value corresponding to 2 mm for instance, the sensing device causes a block-actuating setting device 32 attached to the sector plate 3, 4 to move the end sleeve 31 down through 2 mm for instance. This procedure is repeated until the end sleeve 31 has been almost completely consumed and must be replaced.

In this embodiment it is possible to utilize the fact that if for some reason the block 31 should become distanced from the flange 8, the frequency will be increased by a full octave so as to produce a pronounced signal.

It will be understood that the invention is not restricted to the illustrated and described embodiments thereof and that modifications can be made within the scope of the inventive concept as defined in the following claims. This applies particularly to the measuring equipment. The mouth opening 15 of the pipe 9 may be used to measure the clearance, instead of the end openinigs 14 of the pipe 9. When required, pressure and temperature variations can be compensated for in a known manner. By placing the sensing devices 7 on outwardly projecting peripheral fastener lugs 10, essentially constant pressure and temperature conditions can be achieved in normal operation of a regenerative rotary heat exchanger, by virtue of the sensing devices 7 therewith being located on the air side 6 and the gas side 5 respectively.

What is claimed is:

1. A method of sensing a clearance between an object and an object-adjacent surface, and of generating a signal which is representative of a magnitude of said clearance and which is used to control a setting device that is operated to adjust the magnitude of said clearance to a desired magnitude, the method comprising:

providing the object with at least one compressed-air operated pipe that includes a resonance tube that is tuned to a specific frequency and that includes an opening which is adapted to be placed adjacent to said object-adjacent surface such that a resonance frequency of the at least one pipe changes in accordance with the magnitude of the clearance; and identifying and utilizing said resonance frequency to control the setting device to adjust the magnitude of said clearance to the desired magnitude.

2. An arrangement for carrying out the method of sensing a clearance between an object and an object-adjacent surface in accordance with claim 1, wherein:

the object is provided with a sensing device that comprises the at least one pipe and that is operated using compressed-air taken from a compressed-air sources;

the at least one pipe is tuned to a resonance frequency and has at least one sound-emitting end opening;

the at least one pipe is positioned with the at least one sound-emitting end opening located adjacent to said object-adjacent surface so that the resonance frequency of the at least one pipe is dependent on the magnitude of the clearance between the object and the object-adjacent surface; and the setting device is adapted to be controlled in accordance with an output from a resonance frequency measuring device that identifies the resonance frequency of the at least one pipe.

3. An arrangement according to claim 2, wherein the at least one pipe comprises a straight open pipe which is mounted on the object at right angles to said object-adjacent surface with a gap between the object-adjacent surface and the at least one sound-emitting end opening of the at least one pipe.

4. An arrangement according to claim 2, wherein the at least one pipe comprises a straight open pipe which is mounted on the object and which has an open end which is extended by an end sleeve made of at least one of carbon and graphite, and wherein said end sleeve forms a continuation of the at least one pipe in a manner such that an open end of the end sleeve is arranged to slide on the object-adjacent surface and the object-adjacent surface closes said open end of the end sleeve.

5. An arrangement according to claim 2, wherein:

the object comprises a sector plate on a regenerative rotary heat exchanger;

the object-adjacent surface comprises a peripheral flange on a rotor of said heat exchanger; and the sector plate is provided on at least one side thereof with a part which projects out peripherally opposite the peripheral flange of the rotor and which carries the sensing device.

6. An arrangement according to claim 3, wherein:

the object comprises a sector plate on a regenerative rotary heat exchanger;

the object-adjacent surface comprises a peripheral flange on a rotor of said heat exchanger; and the sector plate is provided on at least one side thereof with a part which projects out peripherally opposite the peripheral flange of the rotor and which carries the sensing device.

7. An arrangement according to claim 4, wherein:

the object comprises a sector plate on a regenerative rotary heat exchanger;

the object-adjacent surface comprises a peripheral flange on a rotor of said heat exchanger; and the sector plate is provided on at least one side thereof with a part which projects out peripherally opposite the peripheral flange of the rotor and which carries the sensing device.

* * * * *